(12) United States Patent
Angelini

(10) Patent No.: US 10,569,848 B2
(45) Date of Patent: Feb. 25, 2020

(54) REGULATOR FIRST STAGE FOR TWO-STAGE UNDERWATER BREATHING APPARATUSES

(71) Applicant: Mares S.p.A., Rapallo (IT)

(72) Inventor: Sergio Angelini, Lavagna (IT)

(*) Notice: Subject to any disclaimer, the term of this patent is extended or adjusted under 35 U.S.C. 154(b) by 0 days.

(21) Appl. No.: 15/959,259

(22) Filed: Apr. 22, 2018

(65) Prior Publication Data

US 2018/0319472 A1    Nov. 8, 2018

(30) Foreign Application Priority Data

May 4, 2017   (IT) .................. 102017000048221

(51) Int. Cl.
| | | |
|---|---|---|
| B63C 11/22 | (2006.01) | |
| G05D 16/06 | (2006.01) | |
| A62B 9/04 | (2006.01) | |
| A62B 9/02 | (2006.01) | |

(52) U.S. Cl.
CPC ............ B63C 11/2209 (2013.01); A62B 9/02 (2013.01); A62B 9/04 (2013.01); G05D 16/0663 (2013.01); B63C 11/2227 (2013.01)

(58) Field of Classification Search
CPC . B63C 11/2209; B63C 11/2227; B63C 11/22; B63C 2011/2218; G05D 16/0663; A62B 9/04; A62B 9/06; A62B 9/02; Y10T 137/7826; Y10T 137/2036; Y10S 197/908
See application file for complete search history.

(56) References Cited

U.S. PATENT DOCUMENTS

| | | | | |
|---|---|---|---|---|
| 2,061,794 A | * | 11/1936 | Deming ............. | G05D 16/0663 137/505.42 |
| 2,666,278 A | * | 1/1954 | Matasovic ......... | G05D 16/0663 137/454.5 |
| 3,244,196 A | * | 4/1966 | Replogle ................ | A62B 9/006 116/DIG. 42 |
| 3,920,033 A | * | 11/1975 | Ferrando ............. | B63C 11/2209 137/81.2 |
| 4,062,356 A | * | 12/1977 | Merrifield ................ | A62B 7/04 128/205.22 |
| 4,219,017 A | * | 8/1980 | Shamlian ............ | B63C 11/2209 128/204.26 |
| 4,266,538 A | | 5/1981 | Ruchti | |
| 4,396,032 A | | 8/1983 | Duchesne | |

(Continued)

FOREIGN PATENT DOCUMENTS

| | | | | |
|---|---|---|---|---|
| DE | 19812376 | | 9/1999 | |
| EP | 0937640 A1 | * | 8/1999 | ............. A62B 9/022 |

(Continued)

Primary Examiner — Reinaldo Sanchez-Medina
Assistant Examiner — David Colon-Morales
(74) Attorney, Agent, or Firm — Themis Law

(57) ABSTRACT

A regulator first stage for two-stage underwater breathing apparatuses includes a reduction chamber communicating with a high-pressure gas supply through a balance valve, which is influenced by the pressure of the external environment by a balance diaphragm that, by way of a suitable actuator, acts on the valve. The reduction chamber includes one or more medium pressure outlets, having axes parallel to the operating axis of the balance valve. In one configuration, one or more medium pressure outlets are also provided having axes orthogonal to the operating axis of the valve.

5 Claims, 5 Drawing Sheets

(56) References Cited

U.S. PATENT DOCUMENTS

| | | | | |
|---|---|---|---|---|
| 5,176,169 A | | 1/1993 | Ferguson | |
| 5,184,609 A | * | 2/1993 | Hart | B63C 11/2209 128/204.26 |
| 5,411,018 A | * | 5/1995 | Rinehart | A62B 7/02 128/201.27 |
| 5,497,803 A | * | 3/1996 | Ferrante | A62B 9/02 137/505.42 |
| 5,655,524 A | * | 8/1997 | Atkins | A62B 9/02 128/204.26 |
| 5,746,198 A | * | 5/1998 | Taba | A62B 9/02 128/204.26 |
| 5,775,368 A | * | 7/1998 | Morino | B63C 11/2209 137/375 |
| 5,778,875 A | * | 7/1998 | Morgan | A62B 9/02 128/204.26 |
| 5,810,041 A | * | 9/1998 | Garofalo | B63C 11/2209 137/505.37 |
| 6,227,199 B1 | * | 5/2001 | Garofalo | B63C 11/22 128/204.26 |
| 6,601,609 B2 | * | 8/2003 | Taylor | B63C 11/2209 128/202.27 |
| 6,932,085 B2 | * | 8/2005 | Krawczyk | B63C 11/2227 128/201.26 |
| 7,089,940 B2 | * | 8/2006 | Kellström | B63C 11/2209 128/205.24 |
| 7,921,866 B2 | * | 4/2011 | Aluigi | B63C 11/2209 128/201.28 |
| 8,166,974 B2 | * | 5/2012 | Pedemonte | B63C 11/2227 128/205.24 |
| 9,052,020 B2 | * | 6/2015 | Noceti | B63C 11/2209 |
| 2004/0011361 A1 | * | 1/2004 | Clarke | B63C 11/2209 128/204.26 |
| 2004/0244796 A1 | * | 12/2004 | Semeia | B63C 11/22 128/204.26 |
| 2006/0054167 A1 | * | 3/2006 | Garofalo | B63C 11/02 128/204.26 |
| 2006/0097213 A1 | * | 5/2006 | Stradella | A62B 9/02 251/282 |
| 2010/0212757 A1 | * | 8/2010 | Patterson | G05D 16/103 137/505 |

FOREIGN PATENT DOCUMENTS

| | | | | |
|---|---|---|---|---|
| EP | | 1223102 | 7/2002 | |
| EP | | 1531124 A2 | * 5/2005 | ......... B63C 11/2209 |

* cited by examiner

REGULATOR FIRST STAGE FOR TWO-STAGE UNDERWATER BREATHING APPARATUSES

FIELD OF THE INVENTION

The present invention relates to pressure regulators for the first reduction stage of two-stage underwater breathing apparatuses, and, in particular, relates to regulators provided with a plurality of medium pressure outlets.

BACKGROUND OF THE INVENTION

Different types of pressure regulators for two-stage breathing apparatuses are known, which are by now widespread since more than fifty years in the world of both professional and recreation diving. Over the course of time and the changing diving approach, increasingly directed to the so called "dive tourism", models of these devices have been developed that make increasingly comfortable their use, intended for an increasingly wider and less selected public on a hand, and for specialized users which have become increasingly more demanding on the other hand. The use of balancing jackets, the so called "jackets", being deployed, the regulator first stage had to provide at least one couple of additional medium pressure outlets, in addition to the one intended for the second main stage. This need has raised the issue of how to place these outlets and manage the arrangement of the hoses around the regulator body, and consequently around the cylinder.

In the first stage regulators, generally the reduction chamber, also called medium pressure chamber, communicates with the high-pressure gas supply through a balance valve, that is influenced by the pressure of the external environment by a balance diaphragm acting on the valve by means of a suitable actuator. The high-pressure gas supply can be coaxial to the operating axis of the valve, as document EP1531124 shows, or arranged with the axis perpendicular to the afore said operating axis, as conversely appears from document EP0807571.

The reduction chamber outlets, that in the afore mentioned EP1531124 can be more than one, are conversely generally arranged, as evident in both the mentioned documents but also for example in EP0531195, with the axis perpendicular to the operating axis of the balance valve. This configuration forces some kind of hose arrangement, and offers a more reduced range of possible regulator configurations, which can reduce the comfort level for the user. It should be noted that in this type of activity, although undertaken for recreation, the operational convenience of a technical solution greatly increases the system safety level, since often acting in non-ideal environmental conditions.

SUMMARY OF THE INVENTION

Object of the present invention is therefore to provide a regulator first stage for two-stage breathing apparatuses, that is able to provide larger and different alternatives in the hose arrangement around its body and consequently around the user body since it is provided with a large number of outlets.

Object of the present invention is therefore a regulator first stage for two-stage underwater breathing apparatuses, comprising a reduction chamber communicating with high-pressure gas supply through a balance valve, that is influenced by the pressure of the external environment by a balance diaphragm that, by means of a suitable actuator, acts on said valve, said reduction chamber being provided with at least one or a plurality of medium pressure outlets arranged with their axes parallel to the operating axis of the balance valve.

According to an embodiment in addition to said plurality of medium pressure outlets arranged with their axes parallel to the operating axis of the balance valve, at least one or a plurality of medium pressure outlets are provided which are arranged with their axes orthogonal to the operating axis of said valve.

In a preferred embodiment said regulator comprises a monolithic body in which said reduction chamber is at least partially obtained, and wherein the seat of said balance valve is made coaxial and concentric to said reduction chamber; said body has at least two parallel faces, the balance diaphragm of said valve being arranged on one of the two faces, and the plurality of medium pressure outlets with the axes parallel to the operating axis of the balance valve being arranged on the other face. Advantageously, the high-pressure gas supply duct is arranged with its axis perpendicular to the operating axis of said valve.

In a further variation, the seat of said valve will not take more than 30% of the volume of said monolithic body, and preferably will not take more than 20% of said volume.

Following what afore stated relating to a functional arrangement of the hoses, i.e. the flexible hoses connecting the reduction chamber to the second stage or breathing apparatus, the invention provides a regulator first stage of the previously described type and with one or more of the preceding combinations of characteristics, which regulator first stage is alternatively combined with a second stage which provides a coupling inlet of the end of said hose oriented in the direction of the facial transverse axis and/or with a second stage which provides a coupling inlet of the end of said hose oriented in the direction of the longitudinal axis of the human body in use conditions of the second stage.

In this way two or more different second stages can be combined with the first stage, each of whom being made according to one of the afore said two orientations of the coupling inlet of the hose end and each of whom being connected to a hose intended for one of the outlets of the regulator first stage which have the best orientation in order to minimize the length of the individual hoses and prevent interferences and in particular the same from crossing.

BRIEF DESCRIPTION OF THE DRAWINGS

Further advantages and characteristics of the device according to the present invention will be apparent from the following detailed description of an embodiment thereof, made by way of example and without limitation with reference to the accompanying drawing tables, wherein.

DETAILED DESCRIPTION OF EMBODIMENTS OF THE INVENTION

Figure 1:
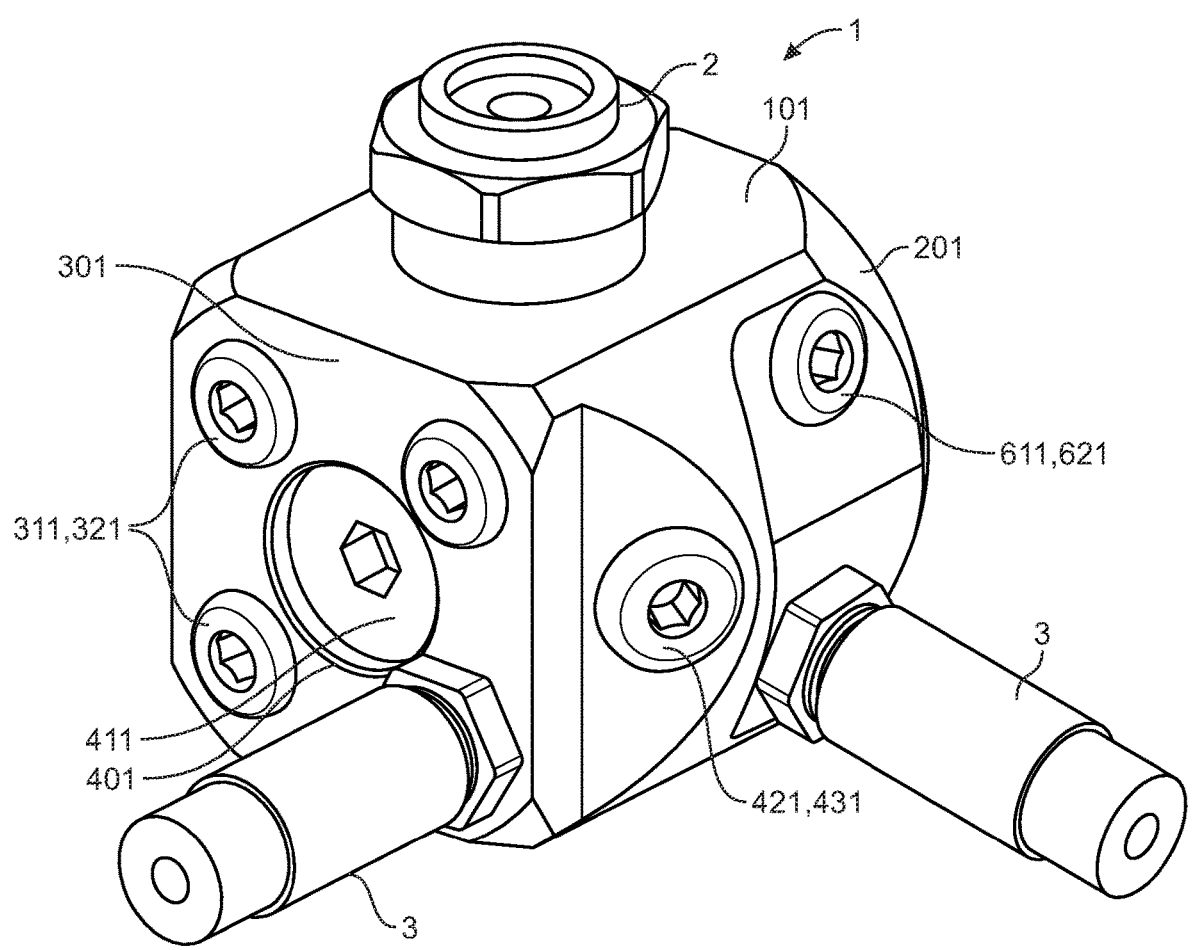
FIG. 1 is a perspective view of an embodiment of the regulator first stage according to the present invention.

FIG. 1 is a perspective view of a preferred embodiment of the regulator first stage according to the present invention; the monolithic body of said regulator, made of metal material or other like material, having convenient strength and workability is denoted with 1. Said body 1 is provided, on the face 101, with the high-pressure gas supply inlet 2, such as air or other gas mixtures, whereas three medium pressure outlets 311 provided with caps 321, and a medium pressure outlet, not visible in figure, coupled with a connecting hose 3 are provided on the face 301 orthogonal to the face 101. The face 201, opposed to the face 301, and parallel to the same, is the one, as evident from FIG. 2 described in the following, on which the assembly comprising the regulator balance diaphragm is arranged. The seat 401 of the balance valve, also shown and described hereinafter, closed by the cap 411, is formed the middle of the face 301 of the body 1. The medium pressure outlet 611, provided with the cap 621, the hose 3 coupled with a similar outlet not visible in the figure, and the high-pressure outlet 421 provided with the cap 431, are also visible on the body 1.

Figure 2:
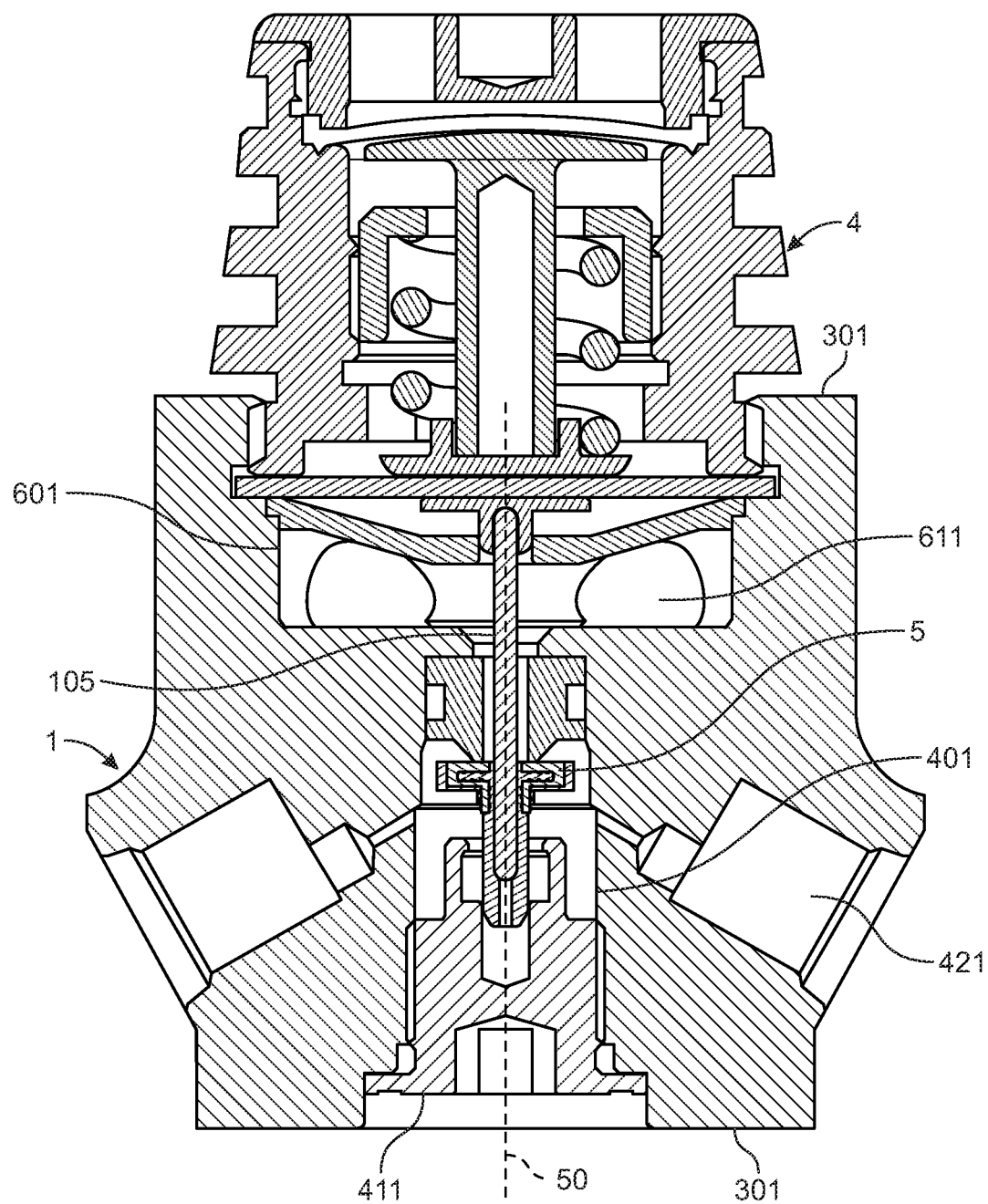
FIG. 2 is a longitudinal sectional view of the regulator of FIG. 1, provided with balance diaphragm.

In FIG. 2 the regulator of FIG. 1 is shown in longitudinal section, provided with the balance diaphragm assembly 4 of a per se known and not better described type, whose characteristics do not fall within the protection scope of the present patent application. Such an assembly 4, coupled with the wall 201, cooperates with the balance valve 5 arranged in the seat 401 through the actuator 105; the operating axis of the balance valve 5 is denoted with 50. The valve 5 regulates the high-pressure gas supply to the reduction chamber 601, to which the outlets 611 are opened. The high-pressure outlets 411 are opened on the seat 401 upstream of the valve 5.

Figure 3:
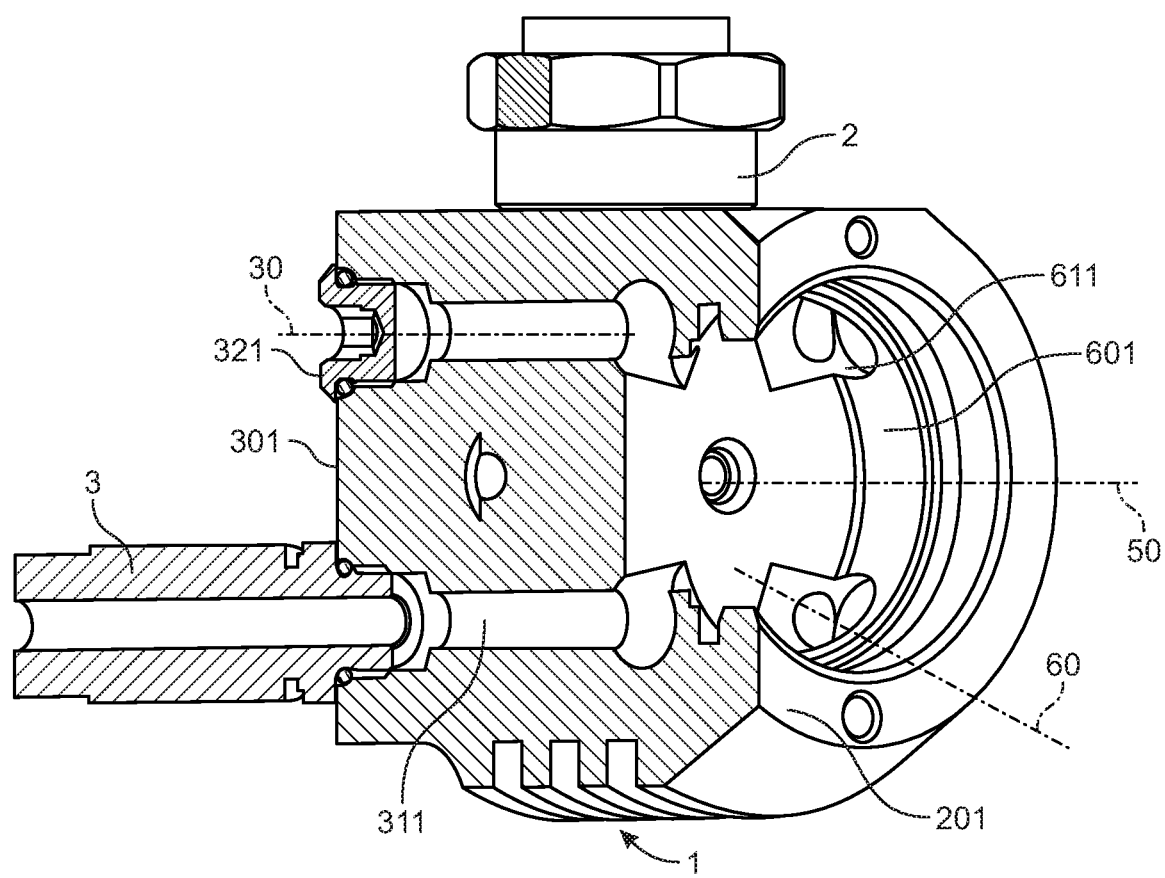
FIG. 3 is a perspective view of the regulator of FIG. 1 with a partial longitudinal section other than that of FIG. 2.
Figure 4:
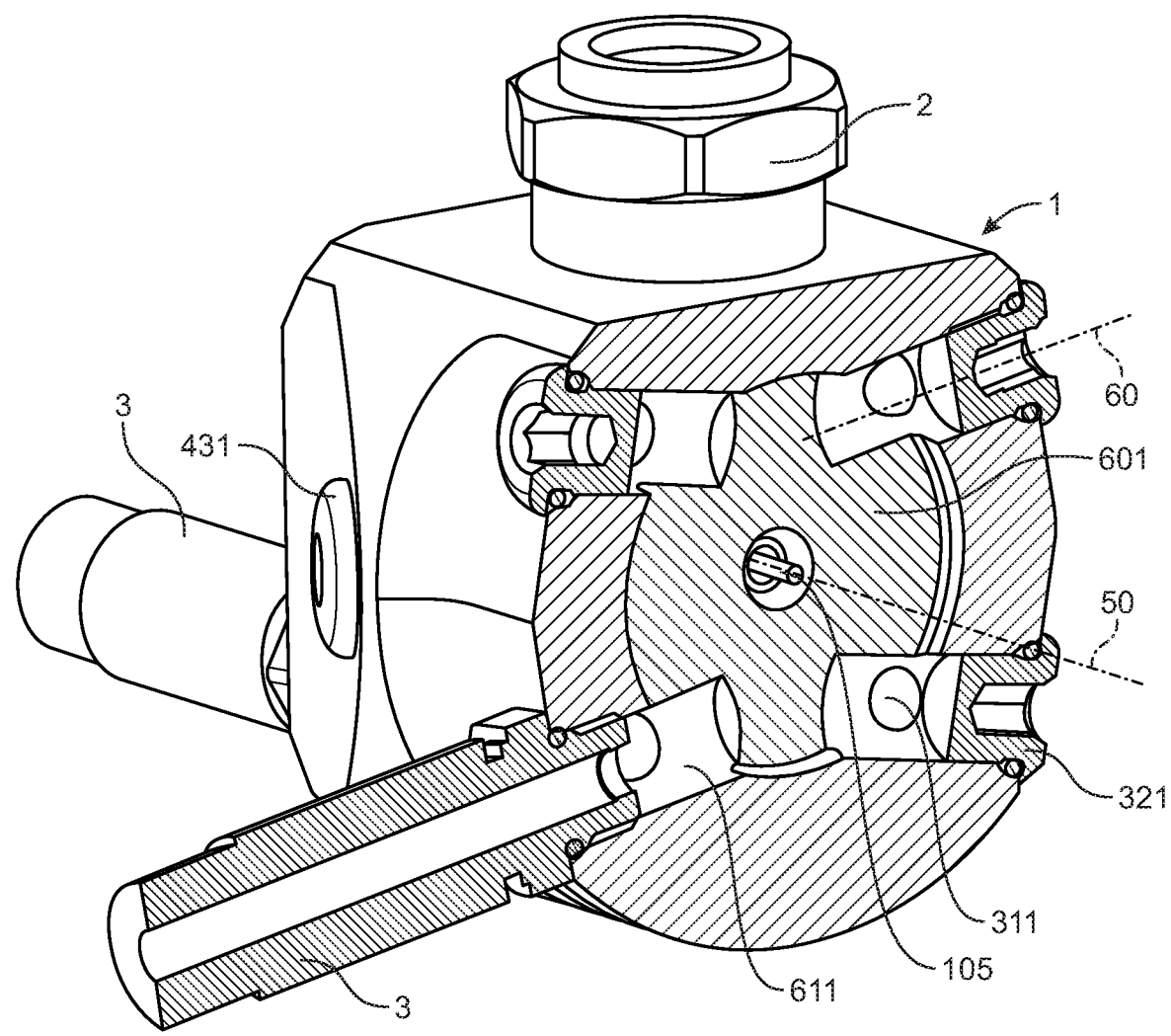
FIG. 4 is a perspective view with a cross section of the regulator of FIG. 1.

The regulator of the preceding figures is shown in FIG. 3, free from the balance diaphragm assembly 4 and partially cutaway; like numerals corresponding to like parts. The reduction chamber 601, from which the medium pressure outlets 611 develop with the axis 60 perpendicular to the operating axis 50 of the balance valve, not visible in figure, and the outlets 311 opening to the reduction chamber 601 with an axis 30 parallel to the axis 50 and leading to the surface of the face 301 of the body 1, wherein they can connect with the hose 3 i.e. be provided with the cap 321, can be seen well in the figure. As it can be noted from FIG. 4 showing a partial cross section at the reduction chamber 601, and wherein like numerals correspond to like parts, the outlets 311 are opened perpendicularly to the outlets 611, which are conversely arranged radially with respect to the said reduction chamber 601.

The embodiment of the regulator first stage according to the present invention and its operation will be apparent from the following. As previously mentioned, in the devices known in the state of the art, the spatial arrangement of the medium pressure outlets directly comes from the regulator construction, and usually allows such outlets to be positioned with the axes substantially perpendicular to the operating axis of the balance valve, i.e. they are radially arranged about the reduction chamber, even also on several plans. This kind of configuration unavoidably limits the number of solutions available for the user for positioning the hoses around his body, and thus reduces the breathing apparatus comfort.

In the proposed solution according to the present invention, the body 1 of the regulator first stage has been designed so as to implement, coaxially to the seat 401 of the balance valve 5, the four medium pressure outlet ducts 311, all leading to the face 301, and all thus having directions perpendicular to the outlets 611 radially arranged about the reduction chamber 601. As it is apparent in particular from FIGS. 1 and 2, the seat 401 has a reduced volume with respect to the total volume of the body 1, such that the medium pressure outlets 311 can be obtained around said seat. Advantageously, the reduction chamber has a section substantially twice with respect to said seat, such to provide convenient spaces for positioning said outlets 311. Preferably, the volume taken by said seat 401 of the balance valve 5 will not exceed 30%, and still more preferably 20% of the total volume of said body 1. The high-pressure gas supply is provided through a duct 2 which is oriented on an axis arranged orthogonally with respect to the operating axis of the valve; this configuration allows the outlets 311 to be arranged without interferences with the cylinder connected with the said supply duct.

The thus designed regulator first stage has a compact, versatile construction, and provides a very wide range of possibilities of arrangement of the hoses around the cylinder and therefore around the body of the user him/herself, by improving the operating comfort and thus also implementing the system safety.

Figure 5:
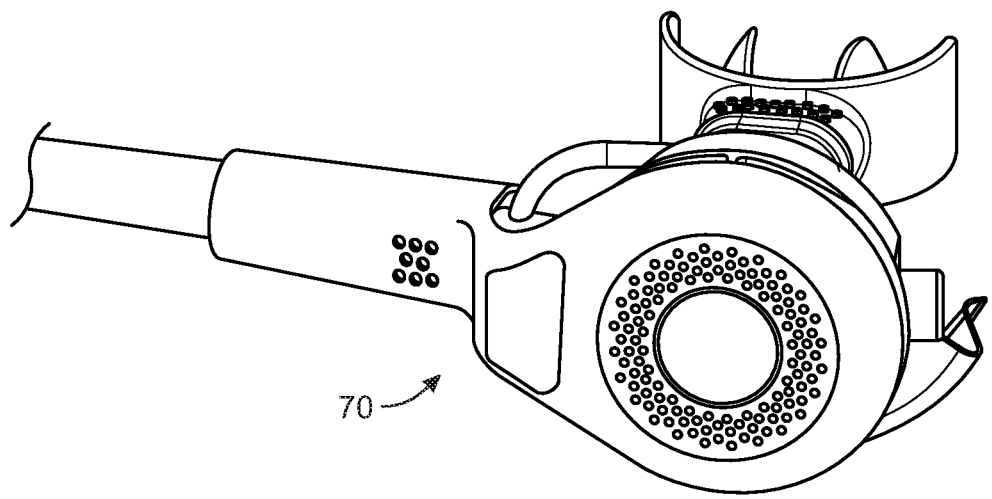
FIGS. 5 and 6 show respectively an example of a second stage with a coupling inlet for the flexible hose oriented according to a transverse axis of the body and a second stage with an inlet for the flexible hose oriented according to a longitudinal axis of the body, with reference to the body of a diver holding the second stage in his/her mouth.
Figure 6:
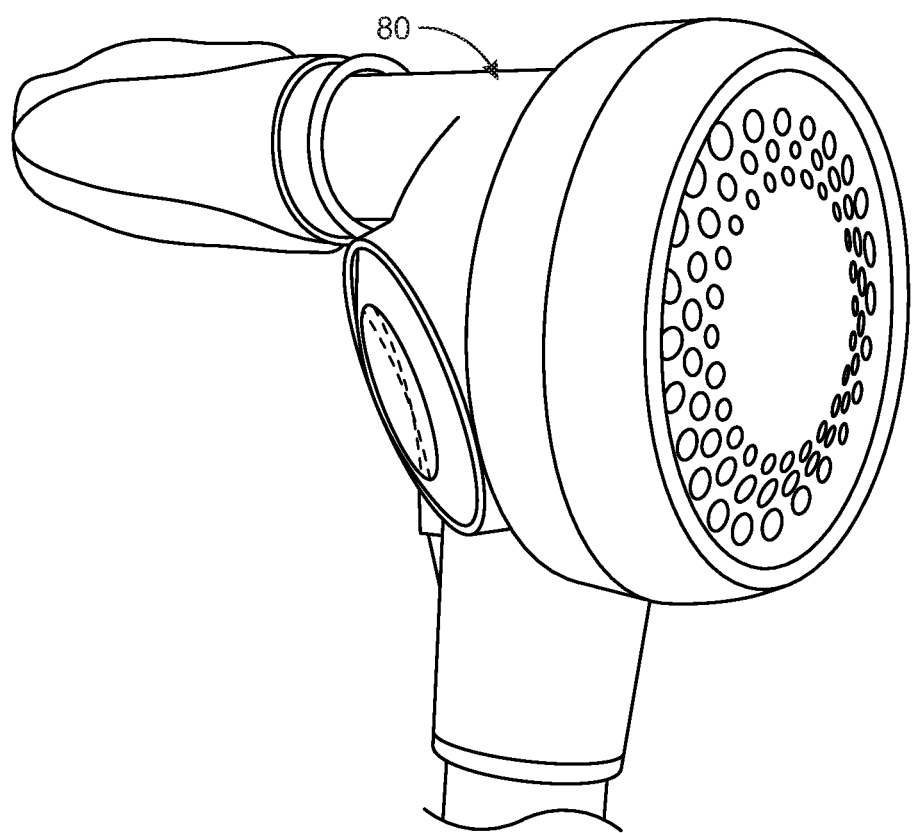

In FIGS. 5 and 6 two variations of a second stage 70, 80 are shown, the latter being intended to be connected with the reduction chamber of the first stage according to the example of the preceding figures alternately or simultaneously through a flexible hose, of which only the end lengths are shown in the figures and which flexible hose is connected with a different outlet for each of the provided second stages, so as to limit the crosses among flexible hoses and to rationalize their paths and reduce their lengths.

As it is apparent FIG. 5 shows a second stage variation with coupling inlet to the end of the flexible hose oriented according to a transverse direction of the body of the user using the second stage. The variation shown provides the inlet on the right side. A variation in which the inlet is on the left side is also possible.

With reference to FIG. 6, conversely the coupling inlet is oriented in longitudinal direction of the axis of the user body when the second stage is in use and furthermore downwards.

It is apparent how since at least two second stages are needed to be provided, the first stage according to the present invention makes the connection of each of the flexible hoses, also named hoses, possible with a first stage outlet which optimizes path, arrangement and length of the flexible hose depending on the second stage type.

The invention claimed is:

1. A regulator first stage for two-stage underwater breathing apparatuses, comprising:
    a reduction chamber (601) communicating with a high-pressure gas supply through a balance valve (5), said balance valve being influenced by a pressure of an external environment by a balance diaphragm (4) acting on said valve with an actuator (105),
    wherein said reduction chamber (601) is provided with one or a plurality of medium pressure outlets (311) having axes (30) parallel to an operating axis (50) of the balance valve (5); and
    one or a plurality of medium pressure outlets (611) having axes (60) orthogonal to the operating axis (50) of said balance valve (5),
    wherein there are provided at least two medium pressure outlets (611) having the axes (60) orthogonal to the operating axis (50) of the balance valve (5), and at least two outlets (311) having axes parallel to the operating axis (50) of the balance valve (5).

2. The regulator first stage according to claim 1, wherein a high-pressure gas supply duct (2) is arranged with its axis perpendicular to the operating axis (50) of the balance valve (5).

3. A regulator first stage for two-stage underwater breathing apparatuses, comprising:
- a reduction chamber (601) communicating with a high-pressure gas supply through a balance valve (5), said balance valve being influenced by a pressure of an external environment by a balance diaphragm (4) acting on said valve with an actuator (105),
- wherein said reduction chamber (601) is provided with one or a plurality of medium pressure outlets (311) having axes (30) parallel to an operating axis (50) of the balance valve (5),
- wherein said regulator comprises a monolithic body (1) within which said reduction chamber (601) is formed, and wherein a seat (401) of said balance valve (5) is made coaxial and concentric to said reduction chamber (601), and
- wherein said monolithic body (1) has at least two opposite parallel faces (201, 301), the balance diaphragm (4) of said balance valve (5) being arranged on one (201) of two faces of said monolithic body and the plurality of medium pressure outlets (311) having the axes (30) parallel to the operating axis (5) of the balance valve being arranged another one of the two faces.

4. The regulator first stage according to claim 3, wherein the seat (401) of said balance valve (5) occupies no more than 30% of a volume of said monolithic body (1).

5. The regulator first stage according to claim 3, wherein said reduction chamber (601) has a section at least twice a section of said seat (401) of said balance valve (5).

* * * * *